United States Patent [19]
Green et al.

[11] Patent Number: 6,013,985
[45] Date of Patent: Jan. 11, 2000

[54] SEALED SOLAR-POWERED LIGHT ASSEMBLY

[75] Inventors: David R. Green; Edward L. Kendrick, both of Victoria, Canada

[73] Assignee: Carmanah Technologies Ltd., Canada

[21] Appl. No.: 09/065,382

[22] Filed: Apr. 23, 1998

[51] Int. Cl.[7] .................................................. H05B 37/02
[52] U.S. Cl. ...................... 315/149; 315/159; 362/183; 362/800
[58] Field of Search ..................................... 315/149, 151, 315/159, 200 A; 362/183, 276, 800; 340/332, 907

[56] References Cited

U.S. PATENT DOCUMENTS 4,751,622   6/1988   Williams ................................. 362/183
5,782,552   7/1998   Green et al. ............................. 362/183

*Primary Examiner*—Haissa Philogene
*Attorney, Agent, or Firm*—Townsend and Townsend and Crew LLP

[57] ABSTRACT

A solar-powered light assembly is sealed and has a battery integral therewith, thus does not require servicing and is not prone to vandalism. The light assembly comprises at least one light-emitting diode (LED) powered by a rechargeable battery integral with the assembly. A solar panel on the assembly recharges the battery, and power management circuitry activates the LED at low ambient light intensities to prevent excessive changing of the battery and to prevent excessive discharge of the battery when it is low.

11 Claims, 3 Drawing Sheets

SEALED SOLAR-POWERED LIGHT ASSEMBLY

FIELD OF THE INVENTION

The present invention relates to a utilized solar-powered light which is sealed and has a battery integral to the light assembly, thus does not require servicing and is not prone to vandalism.

BACKGROUND ART

Unitized solar lights have been developed for marker lighting. Examples are shown in U.S. Pat. Nos. 5,065,291 and 5,211,470. These lights are self contained but they are not sealed. In part this is because the batteries require servicing or replacing, thus the lights cannot be used where the assembly must be able to withstand submersion and they are also prone to vandalism and abuse.

In our co-pending U.S. patent application Ser. No. 08/506, 750 now U.S. Pat. No. 5,782,552 is described a sealed and potted light assembly wherein the energy storage device is a capacitor. Capacitors provide exceptional robustness and are well suited to being completely potted. However, they lack the energy density of batteries with the result that capacitor light assemblies do not produce sufficient light for many applications.

SUMMARY OF THE INVENTION

The present invention provides a brighter light than that disclosed in application U.S. Ser. No. 08/506,750 now U.S. Pat. No. 5,82,552. A completely sealed solar-powered light assembly that has a rechargeable battery integral with the assembly for energy storage is provided. The light assembly is ideal for permanent hazard lighting and can withstand repeated blows by a hammer. The light assembly can be submerged in sea water and cannot easily be removed by vandals when affixed with theft proof screws. The light assembly does not require service and is designed to have an expected life of between five to ten years. A low battery shutoff is provided to prevent excessive discharge of the battery. An input regulator to prevent battery overcharging is provided in a power management circuit and in a preferred embodiment the circuit provides pulsing to minimize current draw of light-emitting diodes (LEDs) which provide the light source.

In another embodiment the light assembly has a microprocessor and infrared detector built into the power management circuit that permits the flash rate of the light assembly and/or the light intensity to be changed by remote control. Furthermore, the infrared detector can also be used to activate or deactivate the light assembly.

In a further embodiment magnetic reed switches are provided that can be activated by magnets applied to the exterior of the light assembly to change the flash rate, change the light intensity or deactivate the light assembly.

In a still further embodiment, the light assembly is housed in a polycarbonate lens with a solar panel potted on the top of the lens. The battery is potted in the base of the lens and the LED light sources and electronics are potted inside the assembly. For some battery types regulations require that a vent be provided to ensure that an explosion cannot occur in the event of battery over heating. Thus, a small one-way valve is built into the base of the light assembly to accommodate this requirement without compromising the integrity of the light.

The present invention provides a sealed solar-powered light assembly comprising at least one light-emitting diode (LED) powered by a rechargeable non-replaceable battery integral to the assembly, a solar panel on the assembly to recharge the battery, power management circuitry to activate the light-emitting diode at low ambient light intensities, to prevent excessive charging of the battery and to prevent excessive discharge of the battery when the battery is low, and the assembly permanently sealed using a potted construction.

BRIEF DESCRIPTION OF THE DRAWINGS

In drawings which illustrate embodiments of the present invention.

DESCRIPTION OF THE PREFERRED EMBODIMENTS

Figure 1:
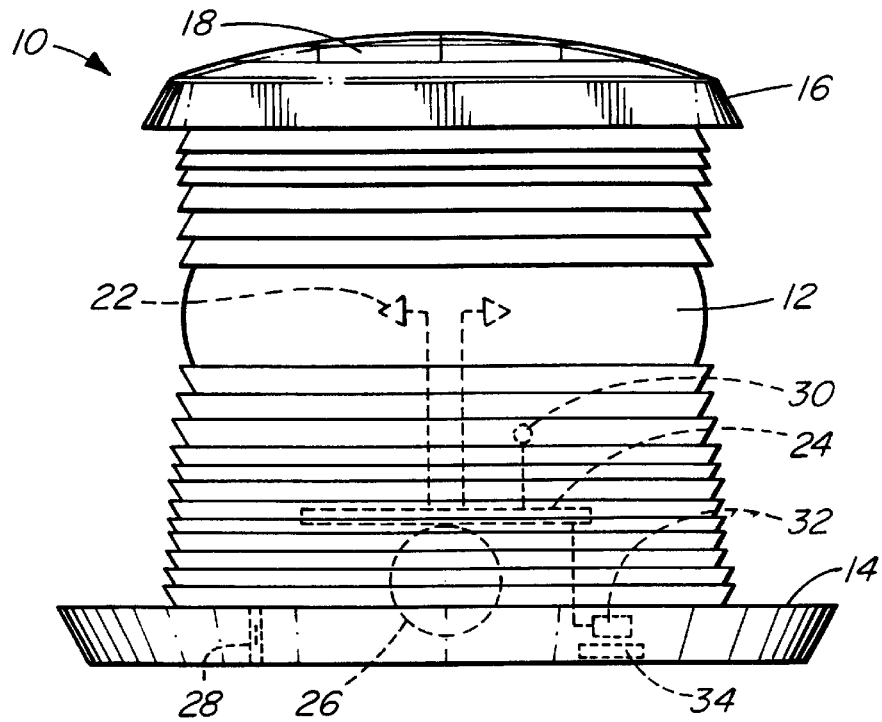
FIG. 1 is a side view showing a light assembly according to one embodiment of the present invention.
Figure 2:
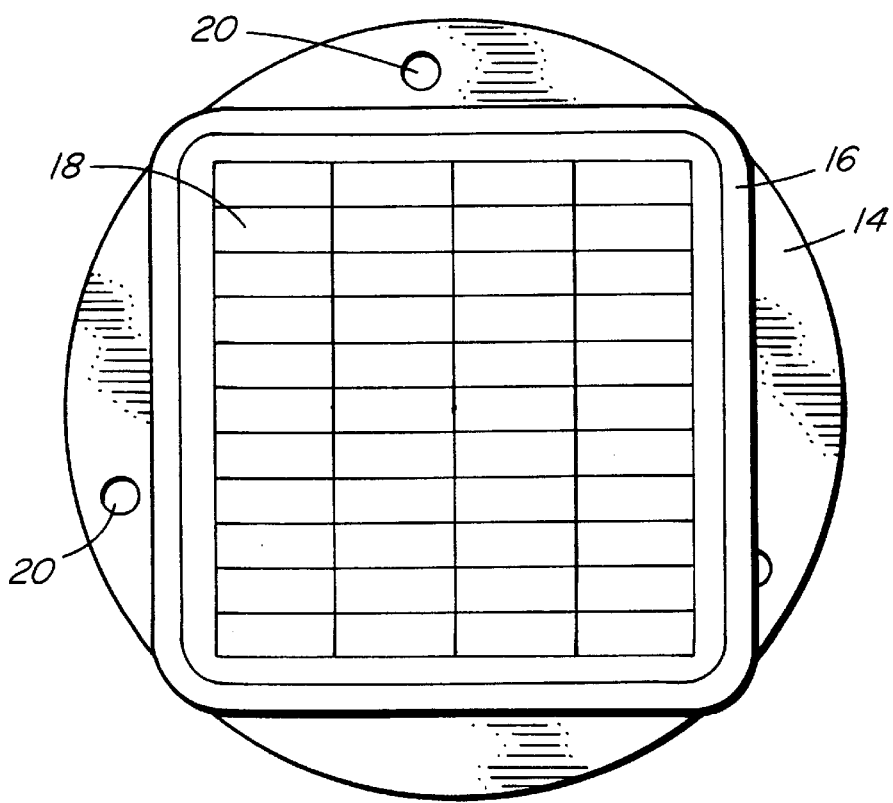
FIG. 2 is a top view showing the light assembly of FIG. 1.

A sealed solar-powered light assembly 10 is shown in FIGS. 1 and 2 which has a polycarbonate lens 12 molded integral with a base 14 and a top 16. A solar panel 18 is potted on the top 16 as shown in FIG. 2. Attachment holes 20 are provided in the base 14 so that the assembly can be attached to a frame or base with theft proof screws or other attachments as required.

Inside the assembly are shown light-emitting diodes (LEDs) 22 connected to a circuit board 24, having the power management circuitry for the unit, which in turn is mounted above a battery 26. The battery is sealed within the lens and potted to the base, thus an integral assembly is formed which cannot have components removed. Maintenance on the light assembly is nil. If it does not operate, then it has to be replaced, which avoids the necessity of servicing the light assembly units and also makes the units substantially vandal proof.

A one-way valve 28 is shown in the base 14 for a vent connecting inside the lens 12 so that gas from the battery 26 can escape should the battery over heat. Because the valve 28 is a one-way valve, it does not permit exterior air or water to enter the light assembly.

An infrared (IR) sensor 30 is shown within the lens and may be activated by a remote IR signal to activate or deactivate the light assembly, to vary the intensity of light or, alternatively, to vary the pulse sequence of the light.

In another embodiment there is also shown a reed switch 32 embedded in the base 14 with a magnet 34 in an external pocket. A plurality of reed switches 32 and magnets 34 may be provided to perform the same function as the IR sensor 30. By removing one magnet from the external pocket in the base 14 of the light assembly one may either activate the light or, for different reed switches, change the pulse sequence or the intensity of the light. The magnets fit in external pockets in the base 14 with the result that the light assembly remains integral and sealed; there is no need to have any outside electrical switches or contacts for the unit. Although FIG. 2 shows both an IR sensor 30 and a reed switch 32, in practice only one or the other is used to control light functions.

Figure 3:
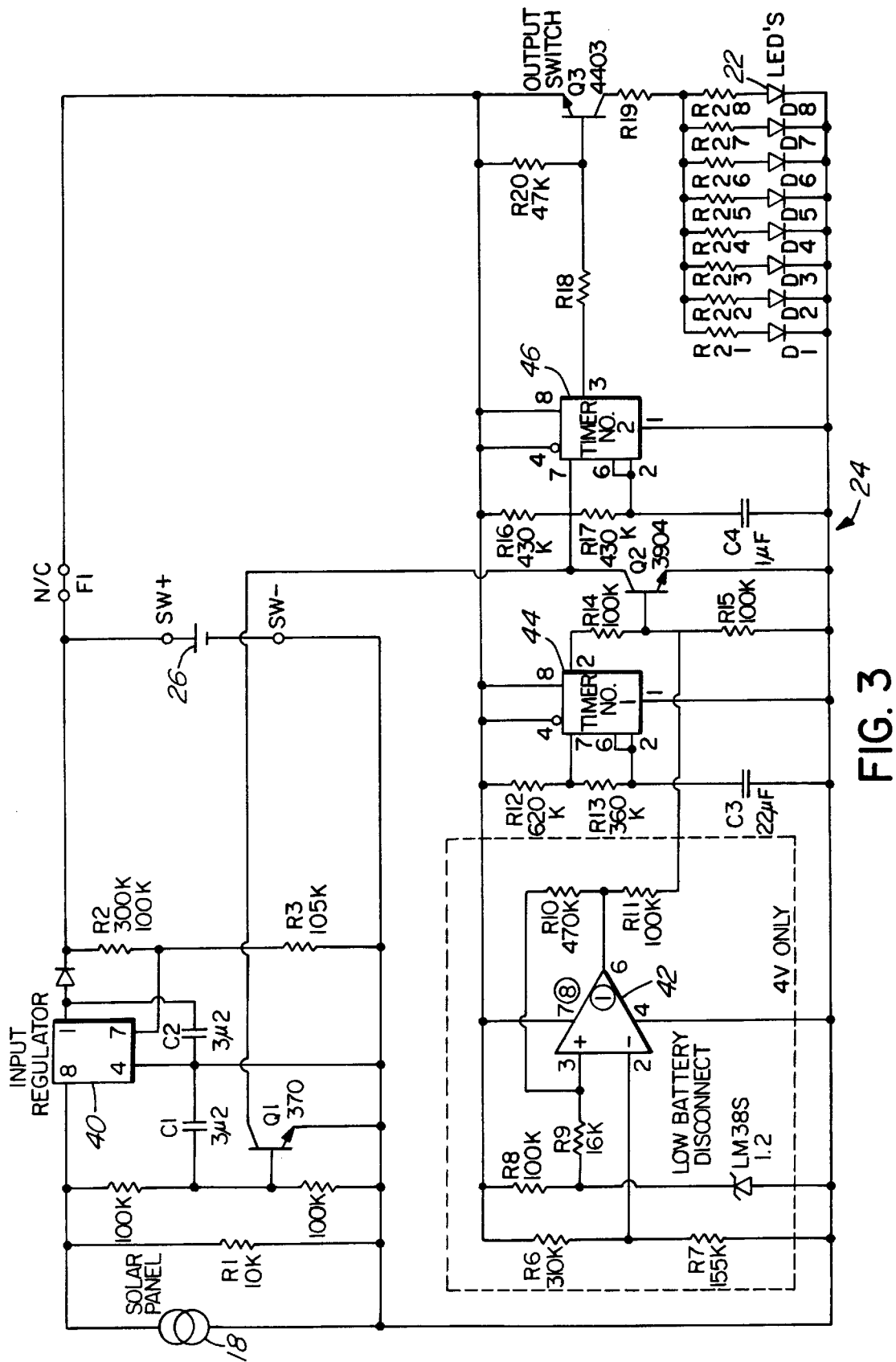
FIG. 3 is a circuit diagram for a light assembly according to one embodiment of the present invention.

One embodiment of a power management circuitry for the light assembly is shown in FIG. 3 in which the solar panel 18 charges the battery 26 which in turn provides power to eight LEDs 22. The number of LEDs may be varied depending upon the size of the light assembly. Different light assemblies may be made for different applications.

An input regulator 40 is included in the power management circuitry 24 to monitor the battery and prevent excessive charging of the battery. Also, a low battery disconnect 42 in the power management circuitry 24 is provided to prevent excessive discharge from the battery 26 to the LEDs 22 when the battery is low. The low battery disconnect 42 disconnects the battery 26 and thus turns off the LEDs 22.

Two timers 44 and 46 are provided in the circuitry 24 to work together to control the pulse sequence of the LEDs. By utilizing two timers 44, 46 more complex patterns of pulsing may be provided for navigational lights and other applications. Whereas two timers are shown herein, one timer or more than two timers may also be provided depending upon the particular application. By pulsing power from the battery 26 to the LEDs, one reduces the power consumption required, thus extending the battery life.

The circuitry shown in FIG. 3 includes fixed resistors and does not have any remote system for changing the pulse sequence of the LEDs or the intensity of the LEDs. Similarly, a fixed resistor RA is shown in the LED array circuit. By having a variable resistor or a series of resistors the light intensity from the LEDs may be varied.

Figure 4:
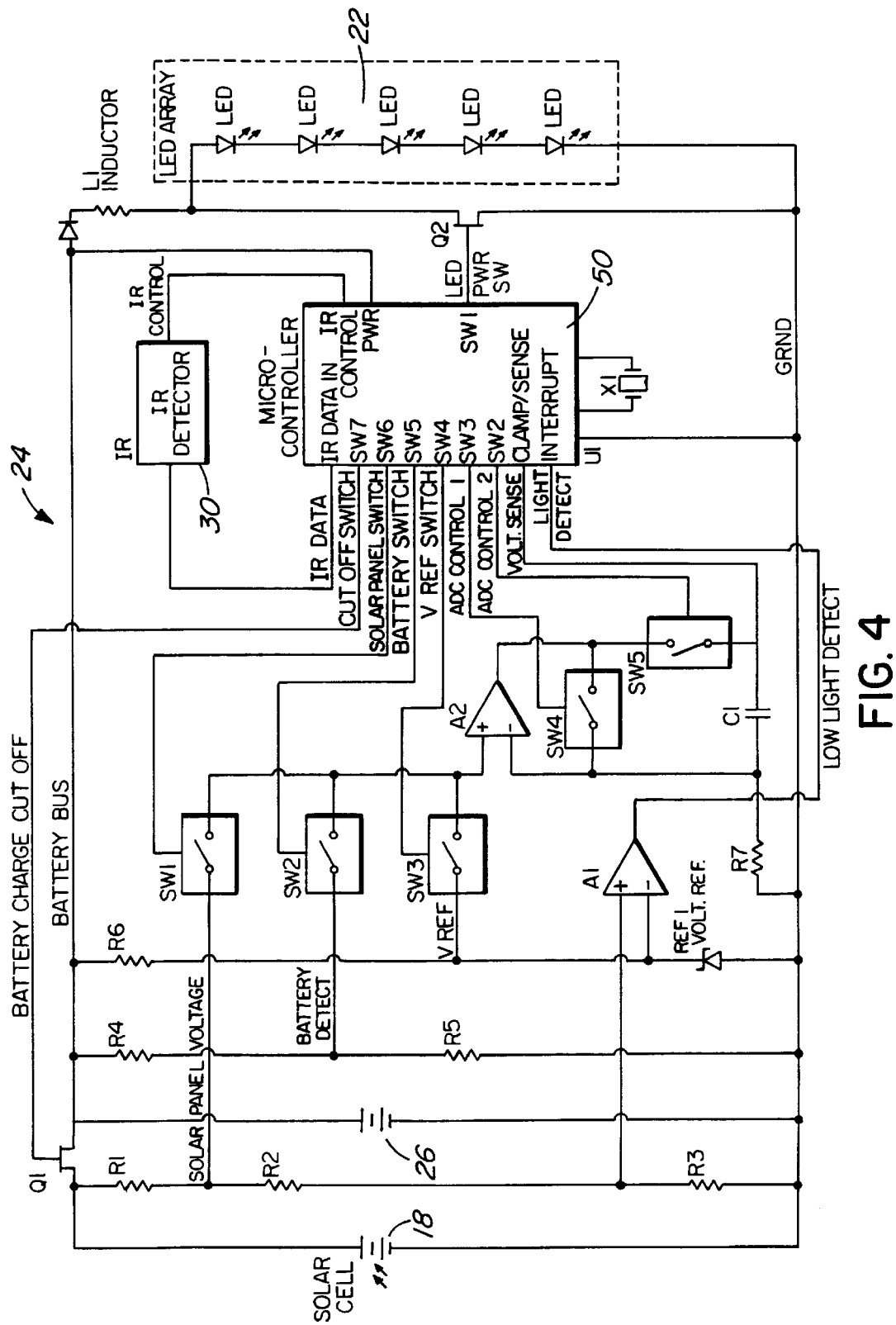
FIG. 4 is a schematic circuit diagram for a light assembly according to a further embodiment of the present invention.

FIG. 4 shows a schematic circuit diagram for a light assembly according to the present invention wherein the power management circuitry 24 includes a micro-processor 50 and is provided with a number of operational features for varying operating parameters of the light assembly. In FIG. 3 the timers are controlled by fixed resistors, thus the time is set. However, by utilizing the micro-processor 50 and an infrared sensor 30, one is able to provide signals to change the resistors to vary the timers and thus change the pulse sequence of the LEDs 22. Whereas an infra red sensor 30 is shown in the circuit, it will be apparent that this may be replaced by reed switches 32 and magnets 34 to perform the same function. As shown in FIG. 4, a series of switches S1 to S8 control solar panel voltage, battery voltage and solar regulator voltage. This last regulator turns on the light at the end of daytime or when the ambient light intensity drops below a predetermined value.

The solar panel 18 in one embodiment consists of an array of photovoltaic cells configured in a series or parallel combination to provide sufficient voltage and current to charge the battery 26. The battery preferably has more than one cell although in some circumstances a single cell suffices.

The input regulator 40 consists of voltage detection circuit with an analog to digital converter and/or one or more voltage comparators. This section is used to detect the voltage level produced by the solar panel which indicates light level and battery charging capability, and the voltage level on the battery which indicates state of charge. This section consists of resistors R1–R7, SW1–SW5, A1, A2, REF1 and C1 shown in FIG. 3.

R1, R2 and R3 form a voltage divider from the solar panel which in conjunction with the voltage reference REF1 and op amp A1 produce the signal LOW LIGHT DETECT or LIGHT DETECT that goes into the micro-controller U1 and can be used to indicate daylight and/or dark conditions.

A2, SW4, SW5, C1 and R7 are configured as an analog to digital converter (ADC) which is controlled by the micro-controller U1 via the signals ADC CONTROL 1 and ADC CONTROL 2. The output of the ADC is detected by U1 via the signal VOLTAGE SENSE. The inputs to the ADC are the signals SOLAR PANEL VOLTAGE, BATTERY DETECT and V REP and are controlled by switches SW1, SW2 and SW3 which are in turn controlled by the micro-controller U1 via the signals SOLAR PANEL SWITCH, BATTERY SWITCH and V REF SWITCH.

The low battery disconnect 42 consists of a battery overcharging protection circuit with a switch or regulator that prevents the battery from being overcharged. As shown in FIG. 3, this consists of the FET Q1 which is configured as a switch used to disconnect the battery 26 from the solar panel 18 and is controlled by the micro-controller U1 via the BATTERY CHARGE CUT OFF or CUT OFF SWITCH signal.

Various changes may be made to the embodiments shown herein without departing from the scope of the present invention which is limited only by the following claims.

We claim:

1. A sealed solar-powered light assembly comprising:
   at least one light-emitting diode (LED) powered by a rechargeable non-replaceable battery integral to the assembly;
   a solar panel on the assembly to recharge the battery;
   power management circuitry to activate the light-emitting diode at low ambient light intensities, to prevent excessive charging of the battery and to prevent excessive discharge of the battery when the battery is low, and
   the assembly permanently sealed using a potted construction.

2. The sealed solar-powered light assembly according to claim 1 wherein the assembly is an integral sealed potted light assembly with a lens containing the LED, the solar panel potted on top of the lens, and the battery and power management circuitry potted in the light assembly.

3. The sealed solar-powered light assembly according to claim 1 wherein the power management circuitry includes pulsing circuitry to pulse the LED and minimize current drawn by the LED.

4. The sealed solar-powered light assembly according to claim 3 wherein the pulsing circuitry includes timers with resistors to control pulse sequence of the LED.

5. The sealed solar-powered light assembly according to claim 4 wherein the power management circuitry includes a micro-processor and an infrared sensor is provided in the light assembly to remotely change the pulse sequence of the LED.

6. The sealed solar-powered light assembly according to claim 3 wherein the power management circuitry includes a micro-processor and an infrared sensor is provided in the light assembly to remotely change the LED light intensity.

7. The sealed solar-powered light assembly according to claim 3 wherein the power management circuitry includes a micro-processor and an infrared sensor is provided in the light assembly to remotely activate and deactivate the light assembly.

8. The sealed solar-powered light assembly according to claim 4 wherein the power management circuitry includes a micro-processor and at least one magnetic reed switch is provided in the light assembly activated by a permanent magnet outside the light assembly to change the pulse sequence of the LED without compromising the integrity of the light assembly.

9. The sealed solar-powered light assembly according to claim 4 wherein the power management circuitry includes a micro-processor and at least one magnetic reed switch is provided in the light assembly to change the intensity of the LED without compromising the integrity of the light assembly.

10. The sealed solar-powered light assembly according to claim 4 wherein the power management circuitry includes a micro-processor and at least one magnetic reed switch is provided in the light assembly to activate or deactivate the light assembly without compromising the integrity of the light assembly.

11. The sealed solar-poweered light assembly according to claim 2 including a one-way valve in the base of the light assembly to permit gas to escape from the light assembly should the rechargeable battery over heat.

* * * * *